US008671225B2

(12) United States Patent
Panesar et al.

(10) Patent No.: US 8,671,225 B2
(45) Date of Patent: *Mar. 11, 2014

(54) METHOD AND APPARATUS FOR SUPPORTING UNIVERSAL SERIAL BUS DEVICES IN A VIRTUALIZED ENVIRONMENT

(75) Inventors: Kiran S. Panesar, Hillsboro, OR (US); Sanjay Kumar, Atlanta, GA (US); Abdul R. Ismail, Beaverton, OR (US); Philip Lantz, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/317,009

(22) Filed: Oct. 6, 2011

(65) Prior Publication Data

US 2012/0030677 A1 Feb. 2, 2012

Related U.S. Application Data

(63) Continuation of application No. 11/207,288, filed on Aug. 19, 2005, now Pat. No. 8,065,441.

(51) Int. Cl.
*G06F 3/00* (2006.01)
*G08B 13/14* (2006.01)

(52) U.S. Cl.
USPC .................................. 710/5; 710/1; 340/568.1

(58) Field of Classification Search
USPC ........................................ 710/5, 1; 340/568.1
See application file for complete search history.

(56) References Cited

U.S. PATENT DOCUMENTS

| 6,725,289 | B1* | 4/2004 | Waldspurger et al. ............. 710/9 |
| 7,069,557 | B2 | 6/2006 | Alferness |
| 7,111,086 | B1* | 9/2006 | Ecoleston et al. ............... 710/33 |
| 7,707,341 | B1 | 4/2010 | Klaiber et al. |
| 2001/0018646 | A1 | 8/2001 | Nagashima et al. |
| 2002/0116565 | A1* | 8/2002 | Wang et al. .................... 710/313 |
| 2002/0143842 | A1* | 10/2002 | Cota-Robles et al. ............ 709/1 |
| 2003/0110334 | A1 | 6/2003 | Lanigan et al. |
| 2003/0188107 | A1* | 10/2003 | Hill et al. ....................... 711/137 |
| 2004/0133728 | A1 | 7/2004 | Ellerbrock et al. |
| 2006/0155667 | A1* | 7/2006 | Tolba ................................ 707/1 |

(Continued)

FOREIGN PATENT DOCUMENTS

| WO | 2005/036405 A1 | 5/2005 |
| WO | 2007/024444 A1 | 3/2007 |

OTHER PUBLICATIONS

Periodic—definition of periodic by the Free Online Dictionary, Thesauraus and Encyclopedia, accessed Jun. 19, 2012, http://www.thefreedictionary.com/periodic.*

(Continued)

*Primary Examiner* — Farley Abad
(74) *Attorney, Agent, or Firm* — L. Cho

(57) ABSTRACT

A method for managing data between a virtual machine a bus controller includes transmitting an input output (IO) request from the virtual machine to a service virtual machine that owns the bus controller. According to an alternate embodiment, managing data between a virtual machine and a bus controller includes trapping a register access made by the virtual machine. A schedule is generated to be implemented by the bus controller. Status is returned to the virtual machine via a virtual host controller. Other embodiments are described and claimed.

27 Claims, 12 Drawing Sheets

(56) References Cited

U.S. PATENT DOCUMENTS

| | | | |
|---|---|---|---|
| 2006/0200820 A1* | 9/2006 | Cherkasova et al. | 718/1 |
| 2007/0040834 A1 | 2/2007 | Panesar et al. | |
| 2007/0067366 A1 | 3/2007 | Landis | |
| 2008/0005608 A1* | 1/2008 | Kondajeri et al. | 714/2 |
| 2008/0201710 A1 | 8/2008 | Anderson et al. | |

OTHER PUBLICATIONS

VMware Workstation 5, Tucows Inc., dated Aug. 18, 2004, pp. 4, available at http://www.vmware.com/products/desktop/ws features.html.
"Using USB Devices in a Virtual Machine", VMware Workstation 3.2, 5 pages available at: http://www.vmware.com/support/ws3/doc/ws32_devices5.html.
Williamson, Mark,"1st Year Progress Report", Jul. 29, 2005, pp. 1-8.
Williamson, M. "XensFS", Aug. 11, 2005, 2 pages.
Wensel, J. "Universal Host Controller Interface (UHCI)" Design Guide, Revision 1.1 Mar. 1996, pp. 1-7 and 10-13.
Fraser, K. et al., "Safe Hardware Access with the Xen Virtual Machine Monitor", Oct. 2004, 10 pages.
Virtual Machine, Aug. 18, 2005, 3 pages. available at: http://en.wikipedia.org/w/index.php?title=Virtual_machine&oldid.
Office Action Received for Chinese Application No. 200680030070.5, mailed on Jul. 1, 2011, 8 pages of Office Action including 5 pages of English Translation.
Office Action Received for Chinese Application No. 200680030070.5, mailed on Nov. 13, 2009, 18 pages of Office Action including 12 pages of English Translation.
International Search Report and Written Opinion Received for PCT Patent Application No. PCT/US2006/030398, mailed on Dec. 29, 2006, 13 pages.
International Preliminary Report on Patentability Received for PCT Patent Application No. PCT/US2006/030398, Mailed on Feb. 28, 2008, 7 pages.
Office Action Received for European Patent Application No. 06789376.8, Mailed on Jul. 29, 2008, 9 pages.
Office Action Received for Chinese Patent Application No. 200680030070.5, Mailed on Mar. 30, 2012, 10 pages of office Action including 6 pages of English translation.
Office Action Received for Chinese Patent Application No. 200680030070.5, Mailed on Oct. 25, 2011, 8 pages of office Action including 5 pages of English translation.

* cited by examiner

METHOD AND APPARATUS FOR SUPPORTING UNIVERSAL SERIAL BUS DEVICES IN A VIRTUALIZED ENVIRONMENT

RELATED APPLICATION

This application is a continuation of and claims priority and benefit to U.S. application Ser. No. 11/207,288 filed on Aug. 19, 2005 now U.S. Pat. No. 8,065,441 entitled "Method and Apparatus for Supporting Universal Serial Bus Devices in a Virtualized Environment".

FIELD

Embodiments of the present invention relate to virtualization. More specifically, embodiments of the present invention relate to methods and apparatus for supporting Universal Serial Bus (USB) devices in virtualized environments.

BACKGROUND

Virtualization is a technique in which a computer system is partitioned into multiple isolated virtual machines (VMs), each of which appears to the software within it to be a complete computer system. A conventional virtual machine manager (VMM) may run on a computer to present the abstraction of one or more VMs or guests to other software. Each VM may function as a self-contained platform that runs its own software stack, including an operating system (OS) and applications. Collectively this software stack is referred to as "guest software."

Guest software running on a VM expects to operate as if it were running on a dedicated computer. For example, the guest software expects to control various computer operations and have access to physical (i.e., hardware) resources during these operations. The VMM controls which physical devices are assigned to each VM and also implements virtual devices which are visible to the VMs. If a physical device is fully assigned to a single VM, it is not available to the other VMs in the computer system. If a physical device is to be shared by more than one VM, the VMM typically implements a virtual device for each VM and arbitrates access of the virtual devices to the physical device.

USB 2.0 (Universal Serial Bus Revision 2.0 Specification, published 2002) is an external bus that supports data rates of up to 480 Mbps. USB 2.0 is an extension of USB 1.1 (Universal Serial Bus Revision 1.1 Specification, published 1996) and is fully compatible with USB 1.1. Current virtualization software solutions provide limited support for USB 2.0.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
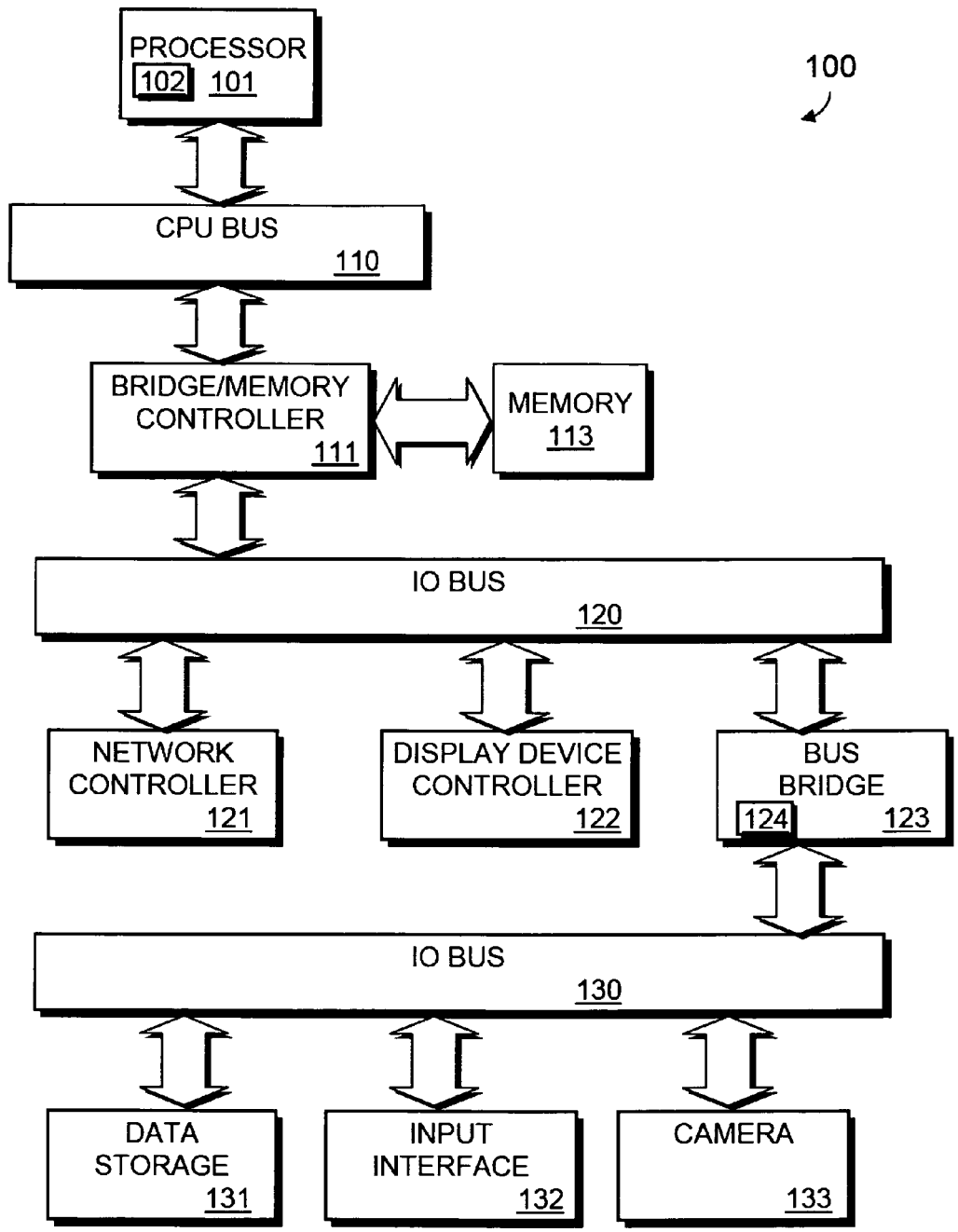
FIG. 1 illustrates an embodiment of a computer system according to an embodiment of the present invention.

FIG. 1 is a block diagram of an exemplary computer system 100 according to an embodiment of the present invention. The computer system 100 includes a processor 101 that processes data signals. The processor 101 may be a complex instruction set computer microprocessor, a reduced instruction set computing microprocessor, a very long instruction word microprocessor, a processor implementing a combination of instruction sets, or other processor device. FIG. 1 shows the computer system 100 with a single processor. However, it is understood that the computer system 100 may operate with multiple processors. Additionally, each of the one or more processors may support one or more hardware threads. The processor 101 is coupled to a CPU bus 110 that transmits data signals between processor 101 and other components in the computer system 100.

The computer system 100 includes a memory 113. The memory 113 may be a dynamic random access memory device, a static random access memory device, read-only memory, and/or other memory device. The memory 113 may store instructions and code represented by data signals that may be executed by the processor 101. A cache memory 102 may reside inside processor 101 that stores data signals stored in memory 113. The cache 102 speeds access to memory by the processor 101 by taking advantage of its locality of access. In an alternate embodiment of the computer system 100, the cache resides external to the processor 101. A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and IO bus 120.

The IO bus 120 may be a single bus or a combination of multiple buses. The IO bus 120 provides communication links between components in the computer system 100. A network controller 121 is coupled to the IO bus 120. The network controller 121 may link the computer system 100 to a network of computers (not shown) and supports communication among the machines. A display device controller 122 is coupled to the IO bus 120. The display device controller 122 allows coupling of a display device (not shown) to the computer system 100 and acts as an interface between the display device and the computer system 100. Alternatively, the display device controller 122 may be connected directly to bridge 111.

IO bus 130 may be a single bus or a combination of multiple buses. IO bus 130 provides communication links between components in the computer system 100. A data storage device 131 is coupled to the IO bus 130. The data storage device 131 may be a hard disk drive, a floppy disk drive, a CD-ROM device, a flash memory device or other mass storage device. An input interface 132 is coupled to the IO bus 130. The input interface 132 may be, for example, a keyboard and/or mouse controller or other input interface. The input interface 132 may be a dedicated device or can reside in another device such as a bus controller or other controller. The input interface 132 allows coupling of an input device to the computer system 100 and transmits data signals from an input device to the computer system 100. A camera 133 is coupled to IO bus 130. The camera 133 operates to capture images that may be displayed on a display device or stored in memory 113.

A bus bridge 123 couples IO bus 120 to IO bus 130. The bus bridge 123 operates to buffer and bridge data signals between IO bus 120 and IO bus 130. The bus bridge 123 includes a bus controller 124. According to an embodiment of the computer system 100, IO bus 130 is a USB 2.0 bus and the bus controller 124 is a host controller (USB host controller). The host controller 124 controls IO bus 130 by executing a schedule of tasks provided. The host controller 124 also sends out packets on IO bus 130, looks for status, and provides a register interface to software.

According to an embodiment of the present invention, the processor 101 executes instructions stored in memory 113 that include virtualization software. The virtualization software supports virtualization on the computer system 100 and usage of input output devices, such as USB 2.0 devices, in a virtualized environment. In one embodiment, virtualization is performed at the USB request buffer level where operating systems in VMs (guest operating systems) run virtual root hub drivers instead of USB system software. The virtual root hub drivers communicate with a dedicated service VM which rims the USB system software. In an alternate embodiment, virtualization is performed at the register level where guest operating systems run legacy USB system software. A USB module resides in a VMM that performs trap and interrupt handling. The virtualization software may support two or more USB 2.0 devices in a virtualized environment and may support isochronous data transfer.

Figure 2:
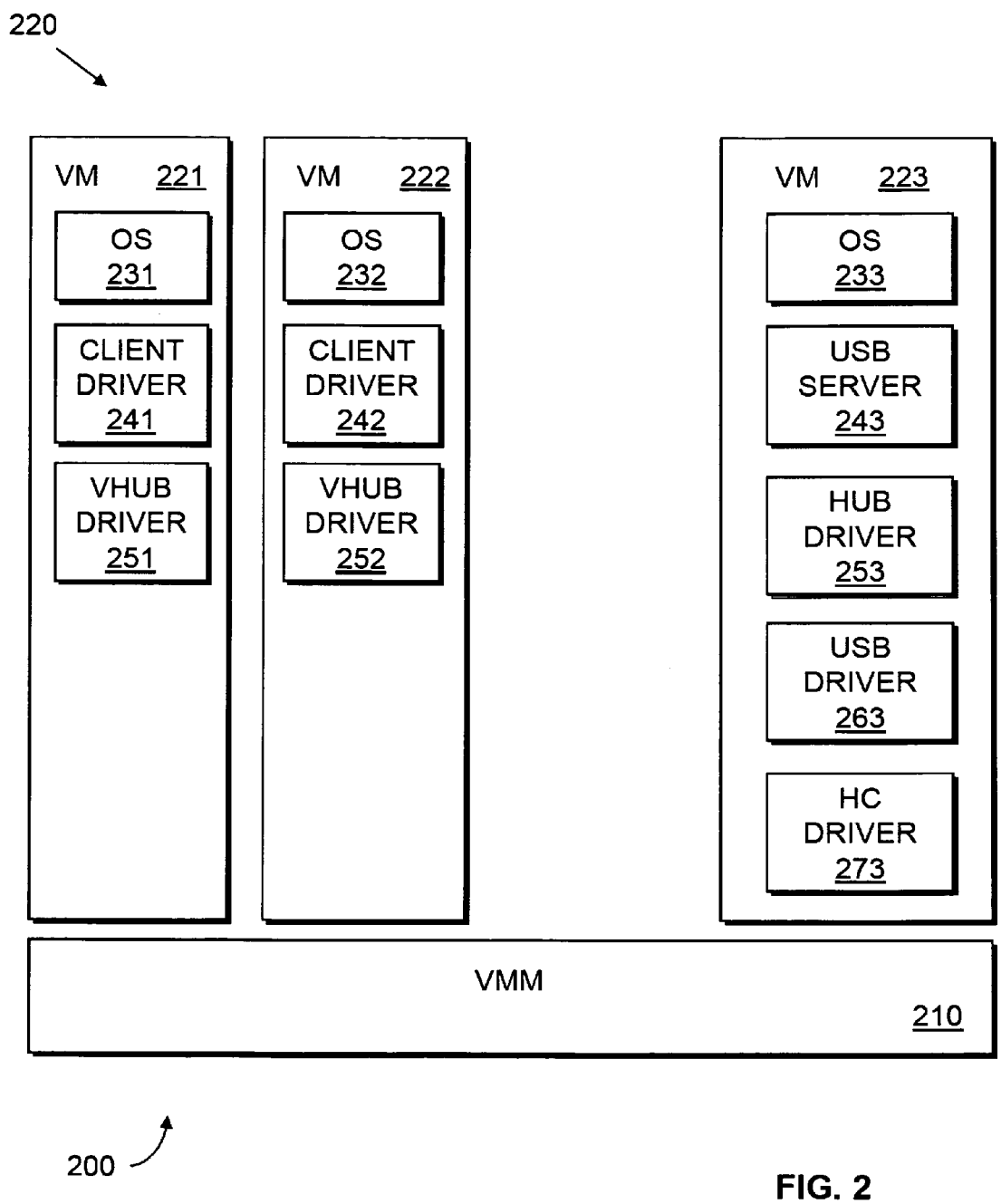
FIG. 2 is a block diagram that illustrates a virtualized environment in which an embodiment of the invention resides according to a first embodiment.

FIG. 2 is a block diagram that illustrates a virtualized environment 200 according to a first embodiment of the present invention. The virtualized environment 200 includes a VMM 210. The VMM 210 interfaces a physical machine. The physical machine may include components of a computer system such as, for example, one or more processors, a memory, buses, a host controller, and various IO devices. According to an embodiment of the present invention, the physical machine may be implemented by the computer system 100 shown in FIG. 1 or a computer system having components similar to those shown in FIG. 1. The VMM 210 facilitates one or more VMs 220 to be nm. According to an embodiment of the present invention, the VMM 210 may be a sequence of instructions stored in a memory of a computer system. The VMM 210 manages and mediates computer system resources in the physical machine between the VMs 220 and allows the isolation of or data sharing between VMs 220. The VMM 210 achieves this isolation or sharing by virtualizing resources in the physical machine and exporting a virtual hardware interface (i.e., a VM) that could reflect an underlying architecture of the physical machine, a variant of the physical machine, or an entirely different physical machine.

The virtualized environment 200 includes one or more VMs 221-223 (collectively shown as 220). According to an embodiment of the present invention, a VM may be described as an isolated model of a machine including, but not limited to, a replica of the physical machine, a subset of the physical machine, or model of an entirely different machine. A VM may include the resources of the computer system in the physical machine, a subset of the resources of the computer system in the physical machine, or entirely virtual resources not found in the physical machine.

According to an embodiment of the present invention, the VMM 210 has control of the physical machine and creates VMs 220, each of which behaves like a physical machine that can run its own operating system (OS). VMs 221-223 may run operating systems (guest operating systems) 231-233 respectively where the operating systems 231-233 may be unique to one another. To maximize performance, the VMM 210 allows a VM to execute directly on the resources of the computer system in the physical machine when possible. The VMM 210 may take control, however, whenever a VM attempts to perform an operation that may affect the operation of other VMs, the VMM 210 or of the operation of resources in the physical machine. The VMM 210 may emulate the operation and may return control to the VM when the operation is completed. One or more applications (guest applications) may be run on each of the VMs 221-223.

VMs 221 and 222 include client drivers 241 and 242 respectively. The client drivers 241 and 242 support input output devices coupled to an input output bus. According to an embodiment of the present invention, the client drivers 241 and 242 support USB 2.0 devices. VMs 221 and 222 also include virtual root hub (VHub) drivers 251 and 252. The client drivers 241 and 242 submit IO requests to their respective VHub drivers 251 and 252. The VHub drivers 251 and 252 transport the IO requests to an entity that controls a host controller for the physical machine.

The virtualized environment 200 includes a VM 223 that operates as a dedicated service VM. According to an embodiment of the virtualized environment 200, the service VM 223 controls the host controller for the physical machine and operates to virtualize support for an IO bus such as USB 2.0. The service VM 223 includes a USB server 243. The USB server 243 interfaces with the VHub drivers 251 and 252 and receives IO requests from the VHub drivers 251 and 252. According to an embodiment of the present invention, the VHub drivers 251 and 22 and the USB server 243 include a plurality of queues for storing outstanding IO requests to be processed. The transport between VHubs drivers 251 and 252 and the USB server 243 may be implemented using messaging mechanisms and techniques such as message passing, client-server (sockets), shared memory buffers (inter-VM communication), remote procedure calls, or other procedures.

The service VM 223 includes a hub driver 253. The hub driver 253 detects the attachment and removal of USB 2.0 devices from a USB 2.0 bus. Upon a device attach event, the hub driver 253 may query a device to determine its type and its characteristics. Based upon policy, the hub driver 253 may select which VM the device should attach to. The service VM 223 sends a message to the VHub driver corresponding to the selected VM. The VHub driver may trigger plug-and-play events that lead to the loading of appropriate client drivers.

The service VM 223 includes a USB driver 263. The USB driver 263 manages the USB 2.0 bus. The USB driver 263 makes policy decisions for the USB 2.0 bus and allocates bandwidth for devices on the USB 2.0 bus.

The service VM 223 includes a host controller (HC) driver 273. The HC driver 273 interfaces with a host controller and sets up a schedule that the host controller executes. The schedule may include one or more transfer descriptors (TDs). TDs are IO requests that may include an address in memory in which to start a transfer, a size of the memory to transfer, and a destination USB device and endpoint address. The schedule may also include one or more queue heads (QHs) which point to chains of TDs. According to an embodiment of the present invention, the host controller driver 273 generates a schedule for the host controller that includes both isochronous (periodic) data and asynchronous (bulk) data. The asynchronous data may be scheduled to be executed only after the isochronous data has been executed for a frame. According to an embodiment of the present invention, a frame may be a unit of time during which zero or more data packets may be transmitted.

On completion of an IO request, the USB server 243 returns status values to the appropriate VHub driver. The VHub driver in turn completes the IO request from its corresponding client driver. Interrupts from the host controller are handled by the service VM 223. The service VM 223 also handles device attach events. By implementing USB system software such as the hub drives 253, USB driver 263, and HC driver 273 on the dedicated service VM 223, only one copy of the USB system software needs to be run in the virtualized environment 200. This allows USB 2.0 parameters such as device identifiers, bus power, and isochronous bandwidth to be managed centrally by the service VM 223.

Figure 3:
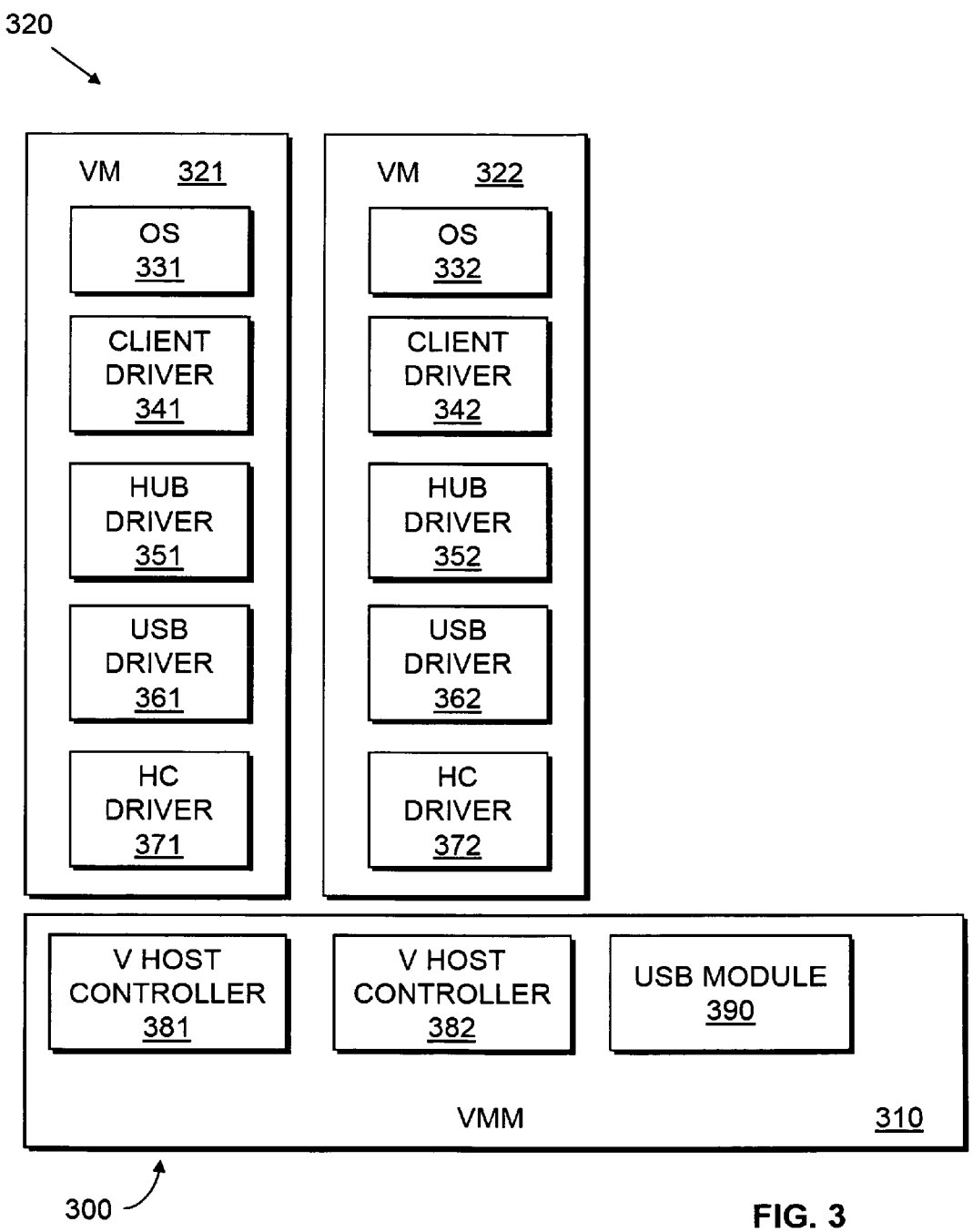
FIG. 3 is a block diagram that illustrates a virtualized environment in which an embodiment of the invention resides according to a second embodiment.

FIG. 3 is a block diagram that illustrates a virtualized environment 300 according to a second embodiment of the present invention. The virtualized environment 300 includes a VMM 310. According to an embodiment of the present invention, the VMM 310 may include properties that are similar to and perform some procedures that are similar to those described with respect to the VMM 210 in FIG. 2. The VMM 310 interfaces a physical machine. The physical machine may be one that is similar to the physical machine described with respect to FIG. 2. The VMM 310 includes a plurality of virtual bus controller. According to an embodiment of the present invention where USB is utilized, the virtual bus controllers may be implemented with virtual host controllers (V Host Controllers) 381 and 382. The virtual host controllers 381 and 382 are presented to VMs in the virtualized environment 300. VMs in the virtualized environment 300 communicate with the virtual host controllers 381 and 382 as if they were the actual host controller in the physical machine.

The VMM 310 includes a bus module. According to an embodiment of the present invention, the bus module may be implemented with USB module 390. The USB module 390 may be a sequence of instructions and associated memory. The USB module 390 controls the host controller in the physical machine and maintains a schedule, called the active schedule that is executed by the host controller. According to an embodiment of the virtualized environment, the USB module 390 traps accesses made by VMs to the virtual host controllers 381 and 382. The USB module 390 may implement the semantics of registers, update the state of the virtual host controllers 381 and 382, and return status of the virtual host controllers 381 and 382. The USB module 390 may also trap accesses to pages that include a schedule. These traps may be implemented as page faults, for example. The pages may include a periodic frame list, QHs, and/or TDs. When a VM updates QHs or TDs, the USB module 390 updates the active schedule. Status information from the active schedule in the USB module 390 may be copied back into a schedule in a VM. The USB module 390 may also generate interrupts in the VM as required by the state of a virtual host controller.

The virtualized environment 300 includes one or more VMs 321-322 (collectively shown as 320). According to an embodiment of the present invention, the VMM 310 has control of the physical machine and creates VMs 320, each of which behaves like a physical machine that can run its own operating system (OS). VMs 321-322 may run operating systems (guest operating systems) 331-332 respectively where the operating systems 331-332 may be unique to one another. One or more applications (guest applications) may be run on each of the VMs 321-322.

The VMs 321 and 322 include client drivers 341 and 342 respectively. The client drivers 341 and 342 support input output devices coupled to an input output bus. According to an embodiment of the present invention, the client drivers 341 and 342 support USB 2.0 devices. The client drivers 341 and 342 generate IO requests to access USB 2.0 devices.

The VMs 321 and 322 includes hub drivers 351 and 352 respectively. The hub drivers 351 and 352 detect the attachment and removal of USB 2.0 devices from a USB 2.0 bus. Upon a device attach event, the hub drivers 351 and 352 may query a device to determine its type and its characteristics.

The VMs 321 and 322 include USB drivers 361 and 362 respectively. The USB drivers 361 and 362 manage the USB 2.0 bus. The USB drivers 361 and 362 make policy decisions for the USB 2.0 bus and allocate bandwidth for devices on the USB 2.0 bus.

The VMs 321 and 322 include host controller (HC) drivers 371 and 372 respectively. The HC drivers 321 and 322 interface with virtual host controllers 381 and 382, respectively. Each host controller driver sets up a schedule for its virtual host controller to execute. The schedule may include TDs and/or QHs that describes activities on each frame of the bus associated with the host controller. According to an embodiment of the present invention, the host controller drivers 371 and 372 generate a schedule for the host controller that includes both isochronous data and asynchronous data.

It should be appreciated that instead of having the USB module 390 trap every VM access that generates or modifies a TD for isochronous data transfers, the host controller drivers 271 and 272 may notify the USB module 390 after one or more TDs have been generated or modified by its corresponding VM. This allows the USB module 390 to process isochronous schedules without having to trap every VM access that generates or modifies a TD which reduces overhead and is more efficient. According to an embodiment of the present invention, notification may be provided to the USB module 390 when an endpoint is opened or closed or when an isochronous transfer is setup. The notification may include information about a new endpoint (e.g. device and endpoint number) or information about the new transfer (e.g. device, endpoint numbers, and start and end frames).

By implementing virtual host controllers and a USB module in the VMM, legacy USB system software, such as client drivers, hub drivers, USB drivers and host controller drivers, may be run on the VMs in a virtualized environment. One benefit of host controller register virtualization is that the VMMs can maintain binary legacy compatibility and run legacy guest binaries.

Figure 4:
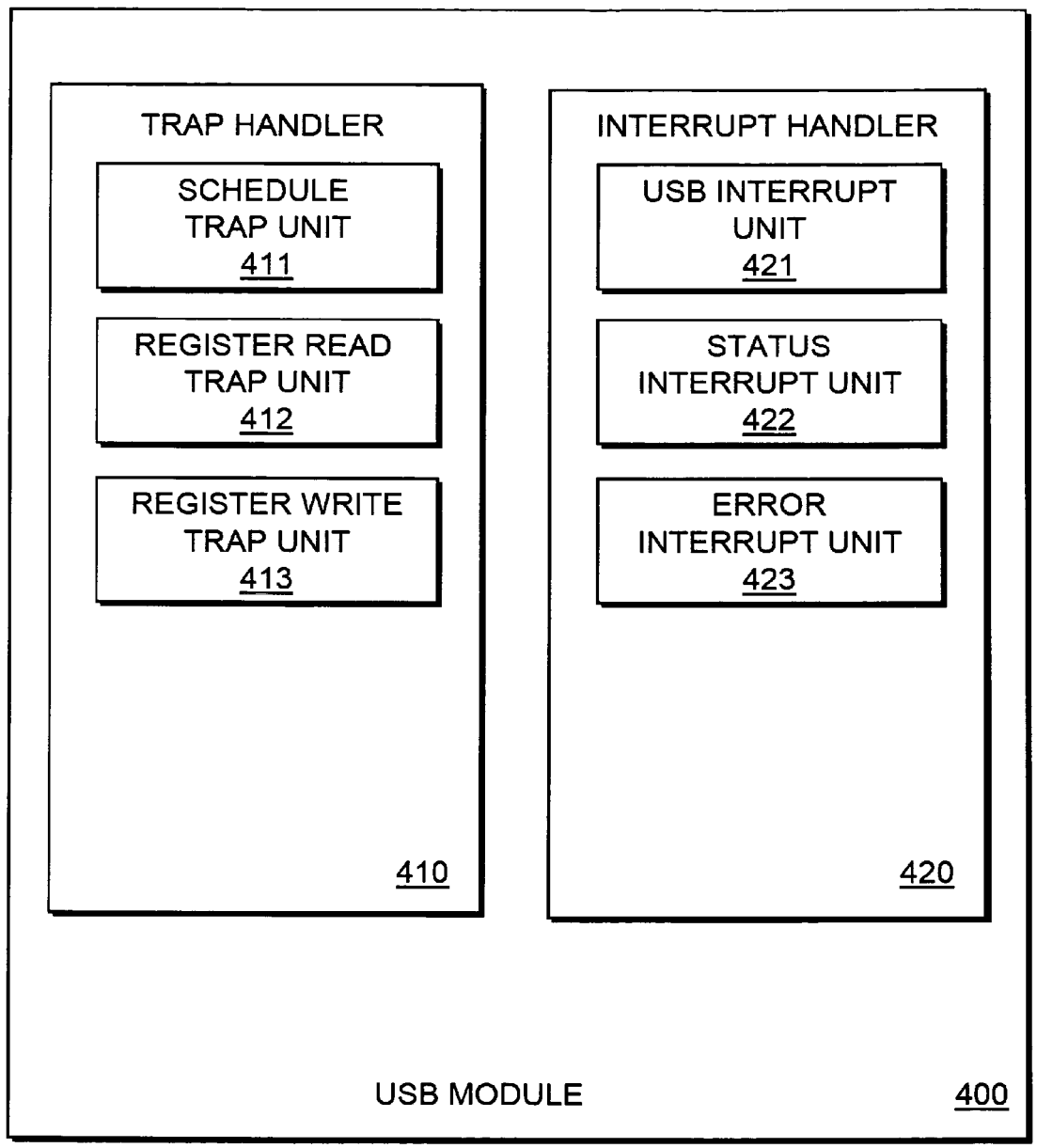
FIG. 4 is a block diagram that illustrates a USB module according to an embodiment of the present invention.

FIG. 4 is a block diagram that illustrates a USB module 400 according to an embodiment of the present invention. The USB module 400 may be used to implement the USB module 390 shown in FIG. 3. The USB module 400 includes a trap handler 410. The trap handler 410 manages register accesses made by a VM. The trap handler 410 includes a schedule trap unit 411. The schedule trap unit 411 traps QH or TD writes and reads by VMs as virtual host controller drivers set up schedules for virtual host controllers. According to an embodiment of the present invention, the schedule trap unit 411 may link schedules generated by virtual host controller drivers together by modifying QHs and TDs in place in the VMs to generate a schedule for the host controller in the physical machine. Alternatively, the schedule trap unit 411 may copy the schedules into the USB module 400 and modify (merge) the copy of the schedules to generate a schedule for the host controller in the physical machine. When a VM updates its schedule, the schedule trap unit 411 may perform the linking or copying. When linking is performed and a VM attempts to read back a schedule, the schedule trap unit 411 returns an expected value that the VM set up. In this embodiment, schedule trap unit 411 may manage and store expected values for the VM. When copying and merging is performed, the schedule trap unit 411 may store the copied and merged copy of the schedule. The schedule trap unit 411 also performs address translation and USB device address translation to support the generation of an active schedule for the host controller in the physical machine.

The trap handler 410 includes a register read trap unit 412. The register read trap unit 412 traps status register reads made by a VM. Status registers may be read to identify various states of a USB 2.0 bus. States indicated by status registers may include, for example, the health of a bus, the presence of errors, the presence of IO devices at ports, and whether a transaction has been completed. The register read trap unit 412 performs status virtualization by returning an appropriate status of a VM that corresponds to the status register read.

The trap handler 410 includes a register write trap unit 413. The register write trap unit 413 traps register writes made by a VM. Registers may be written by a VM to effectuate actions to be performed by a host controller. The register write trap unit 413 manages the register writes to allow a single host controller on the physical machine to be shared by a plurality of VMs. According to an embodiment of the present invention, isochronous and asynchronous list addresses are recorded but not written into registers.

The USB module 400 includes an interrupt handler 420. The interrupt handler 420 manages interrupts made to a processor by a host controller on the physical machine. The interrupt handler 420 includes a USB interrupt unit 421. For interrupts generated by the host controller to indicate that work on a schedule has been completed, the USB interrupt unit 421 identifies which VM submitted the work and generates an interrupt to the identified VM.

The interrupt handler 420 includes a status interrupt unit 422. For interrupts generated by the host controller to indicate that a device has been attached to the physical machine, the status interrupt unit 422 determines which VM to assign the device to. According to an embodiment of the interrupt handler 420, the status interrupt unit 422 makes this determination based on a port number, a device type, a device serial number or other criteria. The status interrupt unit 422 generates an interrupt to the VM.

The interrupt handler 420 includes an error interrupt unit 423. According to an embodiment of the interrupt handler 420, for interrupts generated by the host controller to indicate that an error has occurred, the error interrupt unit 423 determines whether the error is a global error or a local error. If the interrupt was generated in response to a global error, the host controller is stopped. If the interrupt was generated in response to a local error caused by a TD, the error interrupt unit 423 may prompt the host controller to retry the TD or retire the TD.

It should be appreciated that the USB module 400 may include other components such as components for performing memory allocation and deallocation, and initiating asynchronous and isochronous schedules.

Figure 5A:
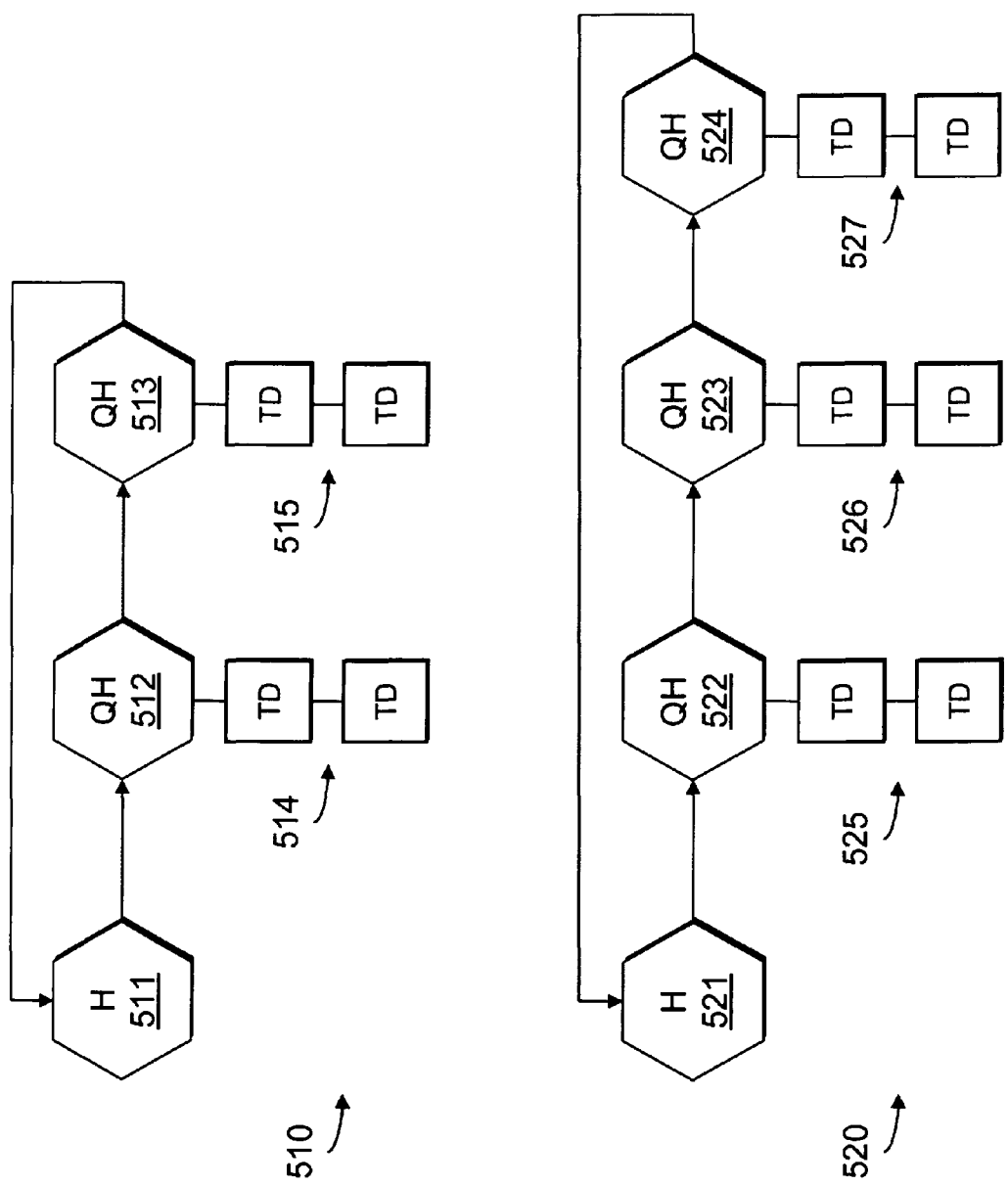
FIG. 5a illustrates an example of asynchronous schedules from VMs.

FIG. 5a illustrates a graphical representation of exemplary asynchronous schedules generated by host controller drivers in VMs. Schedule 510 represents a first asynchronous schedule from a first VM. Schedule 510 includes a plurality of QHs 512-513. Each of the queue heads 512-513 has a chain of TDs 514-515 that may include one or more TDs that hangs from it. Schedule 510 includes a dummy QH (H) 511 that represents the beginning of the schedule. Schedule 520 represents a second asynchronous schedule from a second VM. Schedule 520 includes a plurality of QHs 522-524. Each of the QHs 522-524 has a chain of TDs 525-527 respectively that hangs from it. Schedule 520 includes a dummy QH (H) 521 that represents the beginning of the schedule.

Figure 5B:
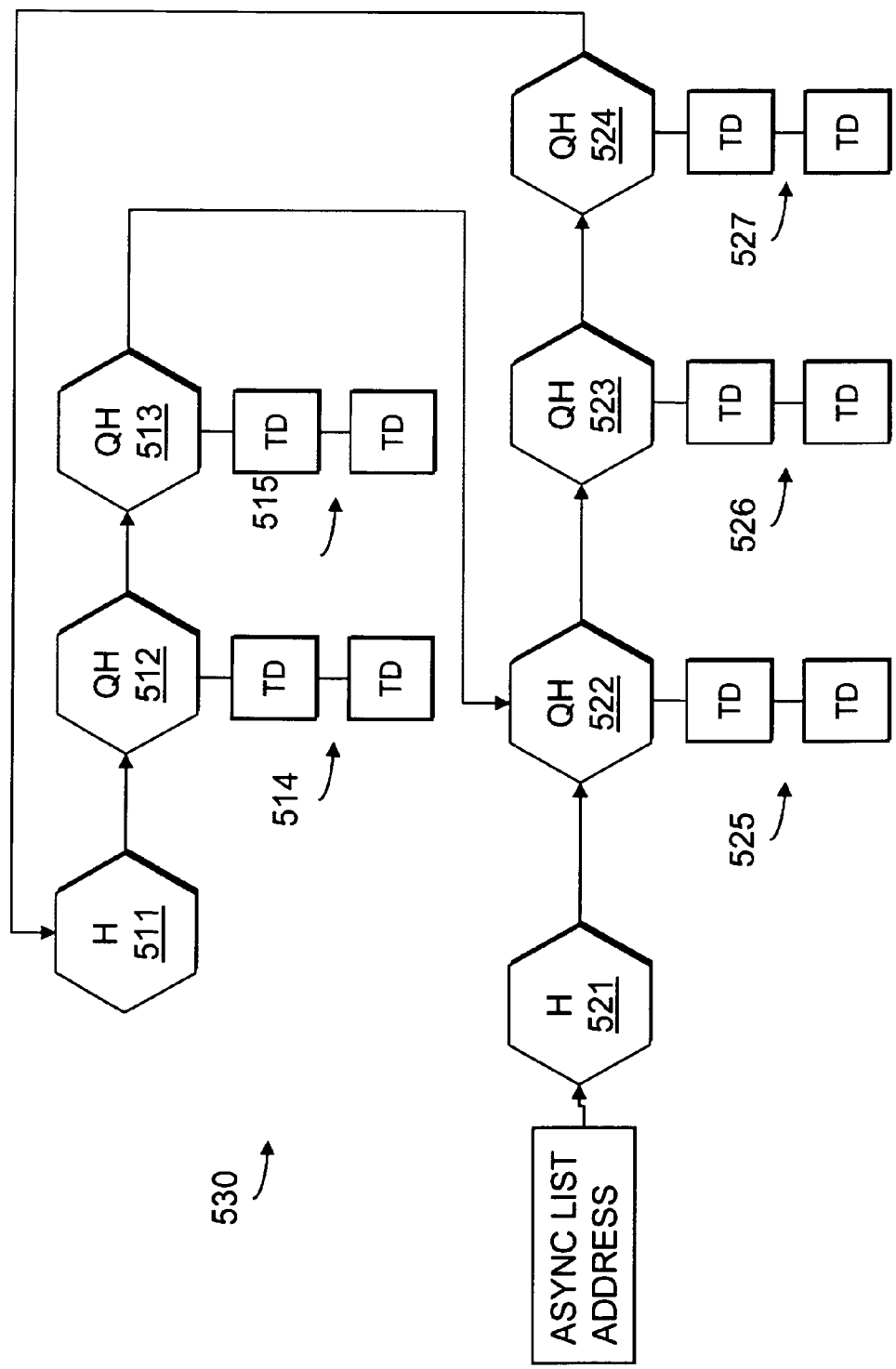
FIG. 5b illustrates an example of how asynchronous schedules may be linked according to an embodiment of the present invention.

FIG. 5b illustrates an example of how asynchronous schedules may be linked according to an embodiment of the present invention. According to an embodiment of the present invention, linking asynchronous schedules is achieved by pointing the last QH in each VM to the first QH of the next VM and pointing the last QH of the last VM to the first VM's dummy QR Schedule 530 represents a linked asynchronous schedule. As shown, the last QH 513 from the first VM is pointed to the first QH 522 of the second VM. The last QH 524 in the second VM is pointed to the dummy QH 511 of the first VM. An asynchronous list address register (async list address) may be a register that includes the address of a next asynchronous queue head to be executed. The linking illustrated may be performed by the schedule trap unit 411 shown in FIG. 4. In this embodiment, the schedules are linked by modifying pointers associated with the QHs stored in the VM. It should be appreciated that although only two VMs are shown, the example can be generalized to n VMs, where n can be any number.

Figure 5C:
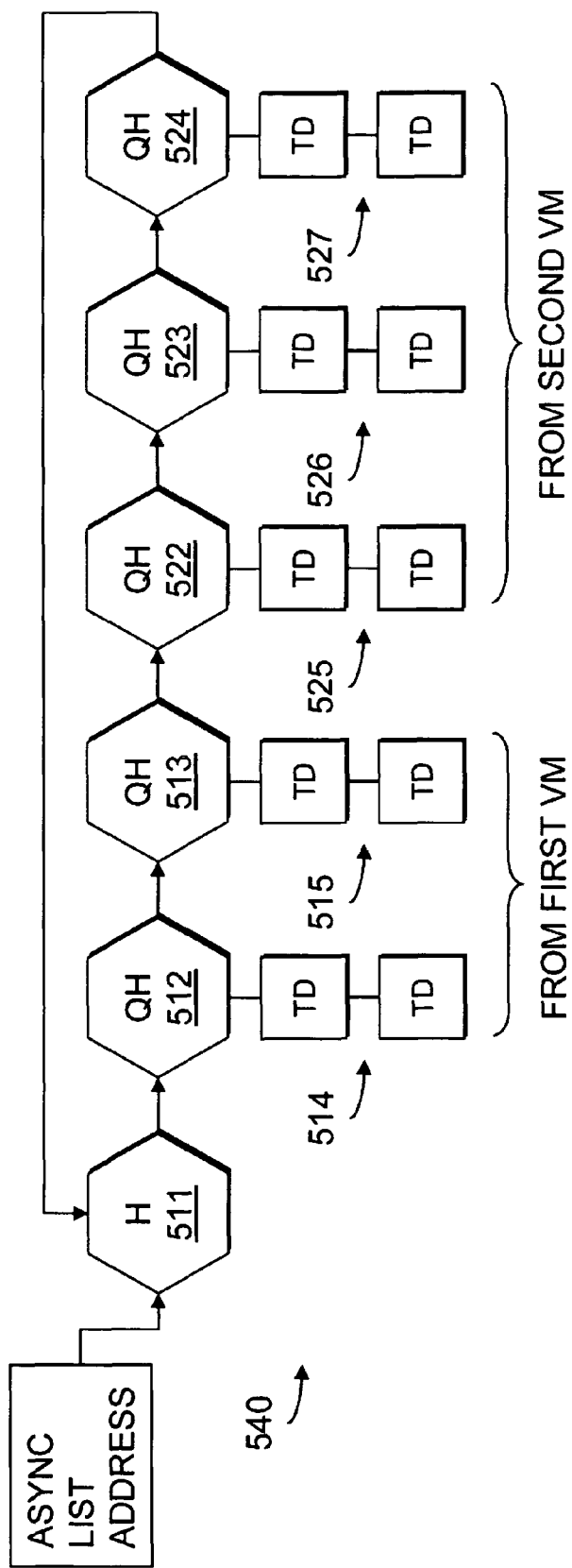
FIG. 5c illustrates an example of how asynchronous schedules may be copied and merged according to an embodiment of the present invention.

FIG. 5c illustrates an example of how asynchronous schedules may be copied and merged according to an embodiment of the present invention. According to an embodiment of the present invention, copying and merging of asynchronous schedules also involves pointing the last QH in each VM to the first QH of the next. VM and pointing the last QH of the last VM to the first VM's dummy QH. However, instead of linking schedules in place in the VMs, a VMM makes a copy of the schedules and merges the copy. Schedule 540 represents a merged asynchronous schedule. As shown, the last QH 513 from the first VM is pointed to the first QH 522 of the second VM. The last QH 524 in the second VM is pointed to the dummy QH 511 of the first VM. An asynchronous list address register (async list address) may be a register that includes the address of a next asynchronous queue head to be executed. The copying and merging illustrated may be performed by the schedule trap unit 411 shown in FIG. 4.

Figure 6A:
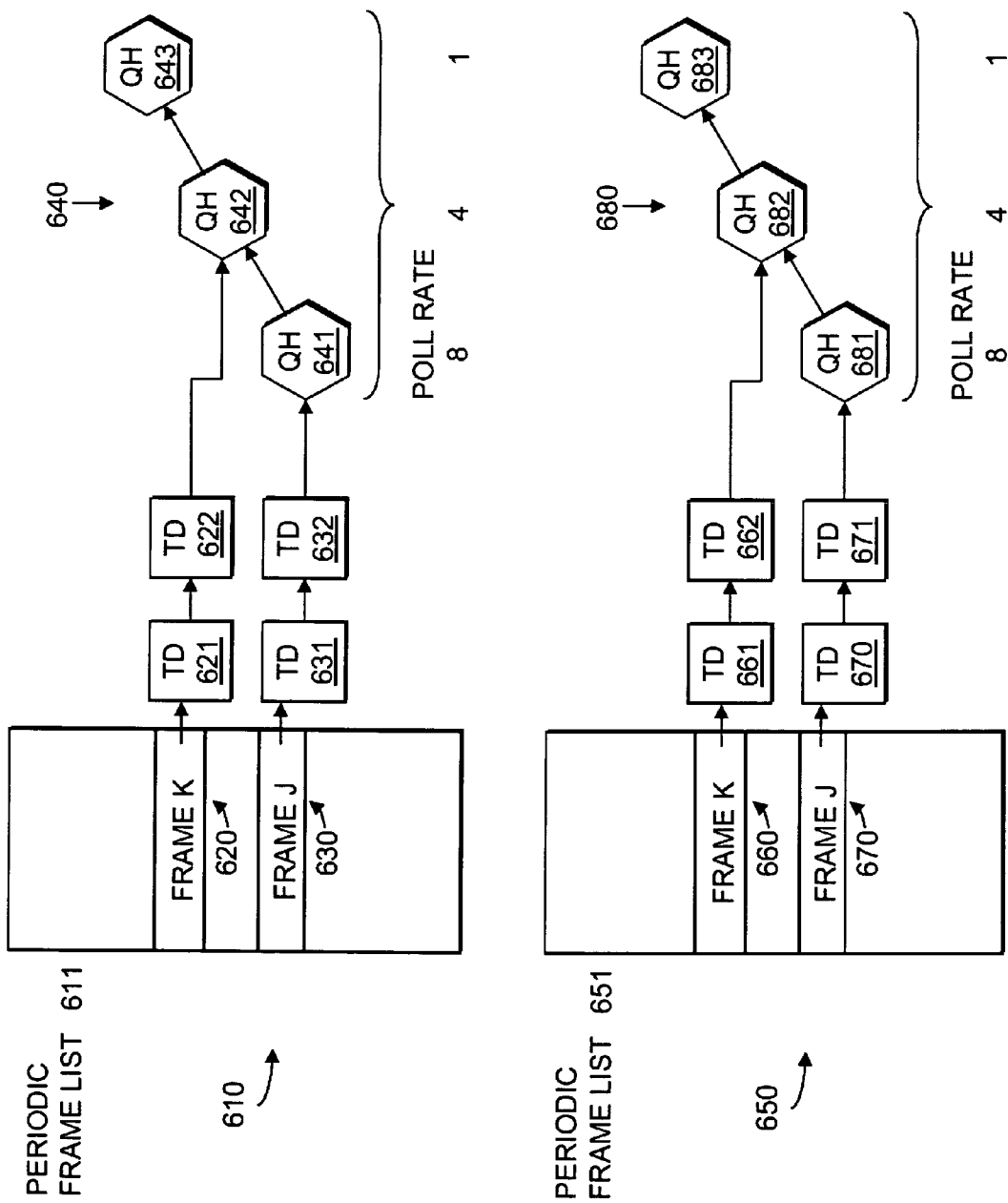
FIG. 6a illustrates an example of isochronous schedules from VMs.

FIG. 6a illustrates a graphical representation of exemplary isochronous schedules generated by host controller drivers in VMs. Schedule 610 represents a first isochronous schedule from a first VM. The schedule 610 includes a periodic frame list 611 that includes a list of time slots or frames. Each frame may have zero or more TDs scheduled for execution. TDs 621-622 correspond to a first frame 620 in the periodic frame list 611. TDs 631-632 correspond to a second frame 630 in the periodic frame list 611. Interrupt tree 640 includes a plurality of QHs 641-643 that correspond to polling rates. TDs 621-622 are associated with QH 642 which has a polling rate of 4 milliseconds and TDs 631-632 are associated with QH 641 which has a polling rate of 8 milliseconds as shown. Schedule 650 represents a second isochronous schedule from a second VM. The schedule 650 includes a periodic frame list 651 that includes a list of time slots or frames. Each frame may have zero or more TDs scheduled for execution. TDs 661-662 correspond to a first frame 660 in the periodic frame list 651. TDs 671-672 correspond to a second frame 670 in the periodic frame list 651. Interrupt tree 680 includes a plurality of QHs 681-683 that correspond to polling rates. TDs 661-662 are associated with QH 682 which has a polling rate of 4 milliseconds and TDs 671-672 are associated with QH 681 which has a polling rate of 8 milliseconds as shown.

Figure 6B:
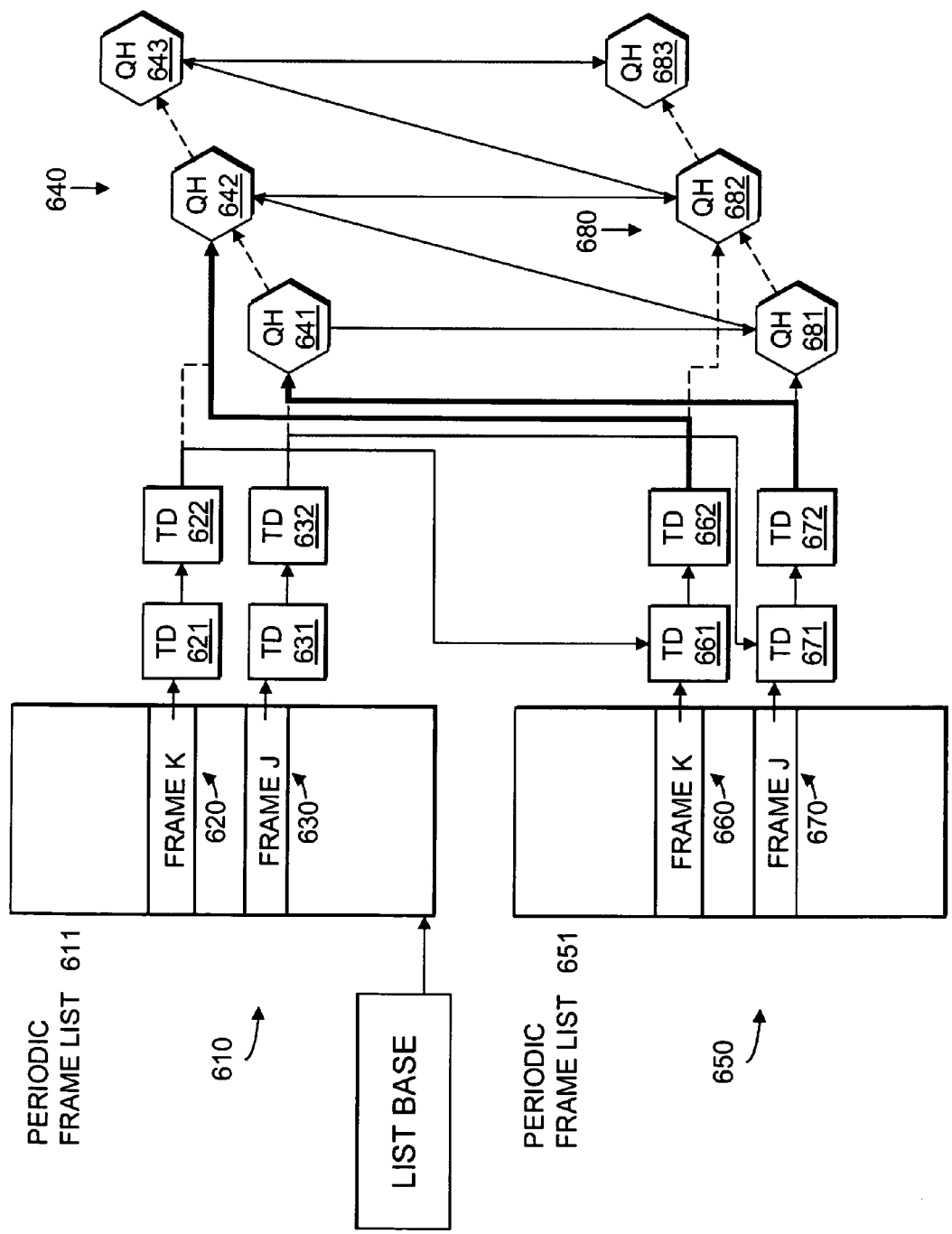
FIG. 6b illustrates an example of how isochronous schedules may be linked according to an embodiment of the present invention.

FIG. 6b illustrates an example of how isochronous schedules may be linked according to an embodiment of the present invention. According to an embodiment of the present invention, linking isochronous schedules is achieved by forming a link list of isochronous TDs in each frame end to end. This may be achieved, for example, by assuming that the host controller drivers are constrained to only a select set of periods, the QHs for the same period may be respectively merged. As shown, TD 621 points to TD 622, TD 622 points to TD 661, and TDs 661 points to TD 662. TDs 631 points to TD 632, TD 632 points to TD 671, and TDs 671 points to TD 672. QH 641 points to QH 681. QH 681 points to QH 642. QH 642 points to QH 682. QH 682 points to QH 643. QH 643 points to QH 683. A periodic frame list base address register (list base) includes a beginning address of a periodic frame list in a system memory. Contents of the periodic frame list base address register are combined with a frame index register to allow a host controller to walk through a periodic frame list in sequence. The linking illustrated may be performed by the schedule trap unit 411 shown in FIG. 4. In this embodiment, the schedules are linked by modifying pointers associated with the TDs stored in the VM.

Figure 6C:
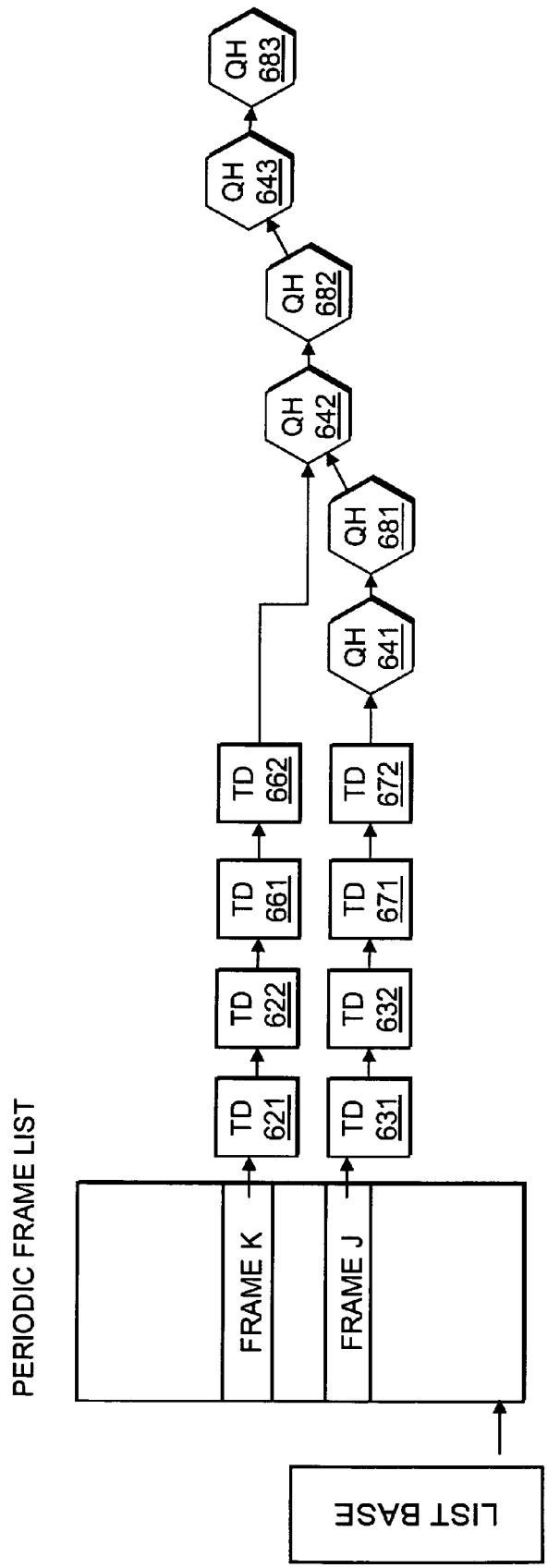
FIG. 6c illustrates an example of how isochronous schedules may be copied and merged according to an embodiment of the present invention.

FIG. 6c illustrates an example of how isochronous schedules may be copied and merged according to an embodiment of the present invention. According to an embodiment of the present invention, copying and merging of isochronous schedules also involves forming a link list of isochronous TDs in each frame end to end and merging the QHs for the same period. However, instead of linking schedules in place in the VMs, a VMM makes a copy of the schedules and merges the copy. As shown, TD 621 points to TD 622, TD 622 points to TD 661, and TDs 661 points to TD 662. TD 631 points to TD 632, TD 632 points to TD 671, and TD 671 points to TD 672. QH 641 points to QH 681. QH 681 points to QH 642. QH 642 points to QH 682. QH 682 points to QH 643. QH 643 points to QH 683. A periodic frame list base address register (list base) includes a beginning address of a periodic frame list in a system memory. Contents of the periodic frame list base address register are combined with a frame index register to allow a host controller to walk through a periodic frame list in sequence. The copying and merging illustrated may be performed by the schedule trap unit 411 shown in FIG. 4.

Figure 7:
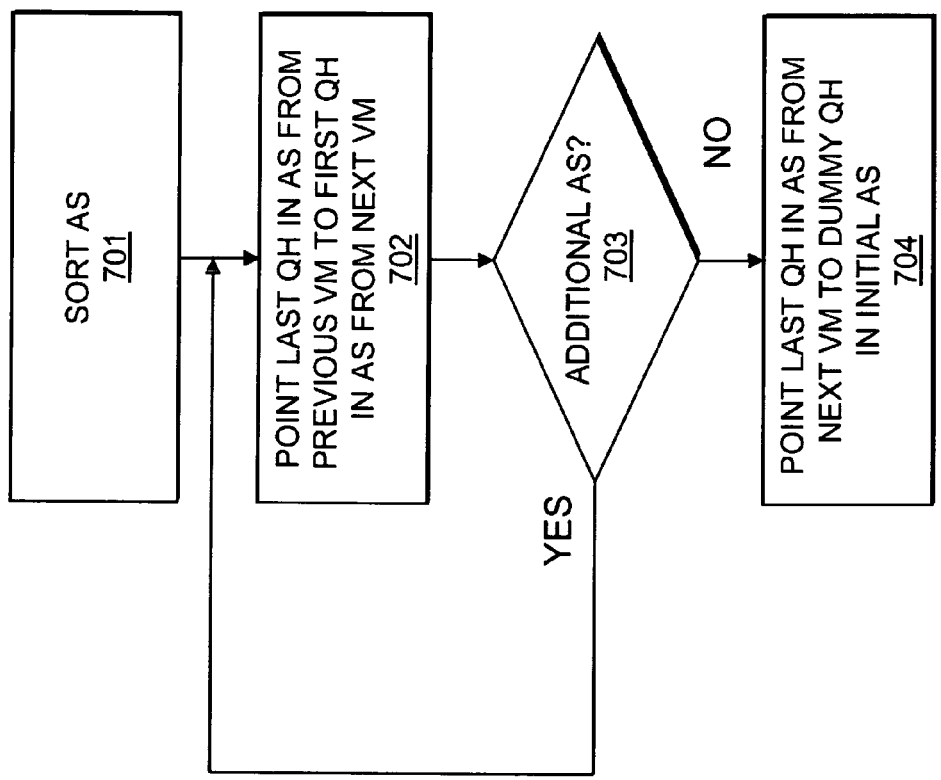
FIG. 7 is a flow chart illustrating a method for generating an asynchronous schedule for a host controller according to an embodiment of the present invention.

FIG. 7 is a flow chart illustrating a method for generating an asynchronous schedule for a host controller according to an embodiment of the present invention. The procedure illustrated may be performed by a USB module such as the one shown in FIGS. 3 and 4. At 701, asynchronous schedules (AS) for virtual host controllers from a plurality of VMs are sorted and placed in an order. The asynchronous schedule from a first (initial) VM to be processed is designated as the first (initial) asynchronous schedule.

At 702, a last QH in an asynchronous schedule from a previous VM is pointed to the first QH in an asynchronous schedule from a next VM.

At 703, it is determined whether an asynchronous schedule from an additional VM exists to be processed. If it is determined that an asynchronous schedule from an additional VM exists to be processed, control returns to 702 and the next VM is designated as the previous VM and the additional VM is designated as the next VM. If it is determined that an asynchronous schedule from an additional VM does not exist to be processed, control proceeds to 704.

At 704, the last QH in the asynchronous schedule from the final or last VM is pointed to a dummy QH in the asynchronous schedule from the initial VM.

Figure 8:
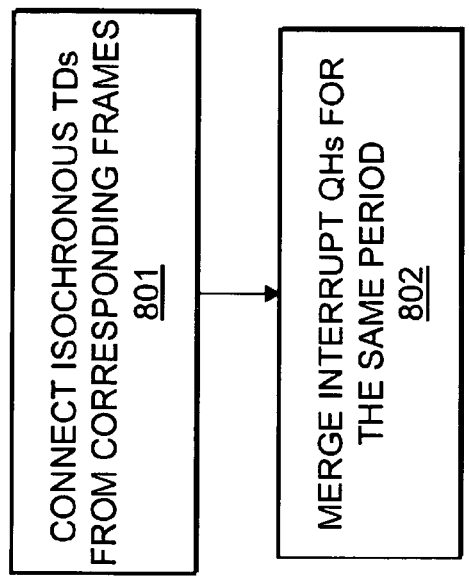
FIG. 8 is a flow chart illustrating a method for generating an isochronous schedule for a host controller according to an embodiment of the present invention.

FIG. 8 is a flow chart illustrating a method for generating an isochronous schedule for a host controller according to an embodiment of the present invention. The procedure illustrated may be performed by a USB module such as the one shown in FIGS. 3 and 4. At 801, the TDs in each frame of a frame list are connected to TDs in corresponding frames of other frame list. According to an embodiment of the present invention, the last TD in a chain of TDs in a frame from a frame list of a first VM points to a first TD in a chain of TDs in a corresponding frame from a frame list of a second VM.

At 802, QHs for the same period or polling rate from the frame lists of the VMs are merged.

FIGS. 7 and 8 are flow charts illustrating methods according to embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A non-transitory computer-readable medium having sequences of instructions stored thereon, the sequences of instructions including instructions which when executed causes a processor to perform managing isochronous data by:
   trapping register accesses that reflect requests to perform tasks on a bus made by one or more virtual machines;
   generating a schedule for a bus controller that indicates when the bus controller is to perform the tasks from the requests trapped; and
   returning status information associated with the schedule generated to the one or more virtual machines via the one or more virtual machines' corresponding virtual host controllers, wherein generating the schedule comprises pointing transfer descriptors in frames from the virtual machine to transfer descriptors in corresponding frames from another virtual machine.

2. The non-transitory computer-readable medium of claim 1, wherein generating the schedule is performed in response to receiving notification that a transfer descriptor has been modified or added.

3. The non-transitory computer-readable medium of claim 1, wherein the virtual machine is a partition of a computer system which appears as a complete computer system to software executing on the virtual machine.

4. A method for performing virtualization, comprising:
   trapping register accesses that reflect requests to perform tasks on a bus made by one or more virtual machines; and
   generating a schedule for a bus controller of when to perform the tasks from the requests trapped by pointing transfer descriptors in frames from the virtual machine to transfer descriptors in corresponding frames from another virtual machine.

5. The method of claim 4 further comprising returning status information to the one or more virtual machines.

6. The method of claim 5, wherein the status information is associated with the schedule generated.

7. The method of claim 5, wherein the returning is performed via the one or more virtual machines' corresponding virtual host controllers.

8. The method of claim 4, wherein generating the schedule is performed in response to receiving notification that a transfer descriptor has been modified or added.

9. The method of claim 4, wherein the virtual machine is a partition of a computer system which appears as a complete computer system to software executing on the virtual machine.

10. The method of claim 4, wherein the pointing is indicated on frame lists in the virtual machines.

11. The method of claim 4, wherein the pointing is indicated on copies of frame lists in a virtual machine monitor.

12. A non-transitory computer-readable medium having sequences of instructions stored thereon, the sequences of instructions including instructions which when executed causes a processor to perform a method comprising:
   trapping register accesses that reflect requests to perform tasks on a bus made by one or more virtual machines; and
   generating a schedule for a bus controller of when to perform the tasks from the requests trapped by pointing transfer descriptors in frames from the virtual machine to transfer descriptors in corresponding frames from another virtual machine.

13. The non-transitory computer-readable medium of claim 12 further comprising returning status information to the one or more virtual machines.

14. The non-transitory computer-readable medium of claim 13, wherein the status information is associated with the schedule generated.

15. The non-transitory computer-readable medium of claim 13, wherein the returning is performed via the one or more virtual machines' corresponding virtual host controllers.

16. The non-transitory computer-readable medium of claim 12, wherein generating the schedule is performed in response to receiving notification that a transfer descriptor has been modified or added.

17. The non-transitory computer-readable medium of claim 12, wherein the virtual machine is a partition of a computer system which appears as a complete computer system to software executing on the virtual machine.

18. The non-transitory computer-readable medium of claim 12, wherein the pointing is indicated on frame lists in the virtual machines.

19. The non-transitory computer-readable medium of claim 12, wherein the pointing is indicated on copies of frame lists in a virtual machine monitor.

20. A computer system, comprising:
   a bus;
   a bus controller to control the bus;
   a memory; and
   a processor that implements a trap handler that traps register accesses that reflect requests to perform tasks on the bus made by one or more virtual machines, and generates a schedule for the bus controller of when to perform the tasks from the requests trapped by pointing transfer descriptors in frames from the virtual machine to transfer descriptors in corresponding frames from another virtual machine.

21. The computer system of claim 20, wherein status information is returned to the one or more virtual machines.

22. The computer system of claim 21, wherein the status information is associated with the schedule generated.

23. The computer system of claim 21, wherein the returning is performed via the one or more virtual machines' corresponding virtual host controllers.

24. The computer system claim 20, wherein generating the schedule is performed in response to receiving notification that a transfer descriptor has been modified or added.

25. The computer system of claim 20, wherein the virtual machine is a partition of a computer system which appears as a complete computer system to software executing on the virtual machine.

26. The computer system claim 20, wherein the pointing is indicated on frame lists in the virtual machines.

27. The computer system of claim 20, wherein the pointing is indicated on copies of frame lists in a virtual machine monitor.

* * * * *

UNITED STATES PATENT AND TRADEMARK OFFICE
CERTIFICATE OF CORRECTION

PATENT NO. : 8,671,225 B2  
APPLICATION NO. : 13/317009  
DATED : March 11, 2014  
INVENTOR(S) : Kiran S. Panesar et al.

Page 1 of 1

It is certified that error appears in the above-identified patent and that said Letters Patent is hereby corrected as shown below:

In the Claims

In column 12, line 53, In Claim 24, delete "system" and insert -- system of --, therefor.

In column 12, line 60, In Claim 26, delete "system" and insert -- system of --, therefor.

Signed and Sealed this
Twenty-fourth Day of June, 2014

Michelle K. Lee
*Deputy Director of the United States Patent and Trademark Office*